(12) United States Patent
Rajagopalan et al.

(10) Patent No.: US 8,751,571 B2
(45) Date of Patent: Jun. 10, 2014

(54) METHODS AND SYSTEMS FOR CPN TRIGGERED COLLABORATION

(75) Inventors: Mahesh Rajagopalan, Irving, TX (US); Nagendra Kunuturi, Irving, TX (US); Afshin Moshrefi, Newburyport, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 1580 days.

(21) Appl. No.: 10/720,933

(22) Filed: Nov. 24, 2003

(65) Prior Publication Data

US 2005/0084087 A1    Apr. 21, 2005

Related U.S. Application Data

(63) Continuation-in-part of application No. 10/083,793, filed on Feb. 27, 2002, and a continuation-in-part of application No. 10/083,792, filed on Feb. 27, 2002, and a continuation-in-part of application No. 10/083,884, filed on Feb. 27, 2002, and a continuation-in-part of application No. 10/083,822, filed on Feb. 27, 2002.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002.

(51) Int. Cl.
*G06F 15/16* (2006.01)

(52) U.S. Cl.
USPC ........................................................ 709/204

(58) Field of Classification Search
USPC ........................................ 709/206, 205, 204
See application file for complete search history.

(56) References Cited

U.S. PATENT DOCUMENTS 4,013,839 A    3/1977   Bell
4,540,850 A    9/1985   Herr et al. ................... 379/88.19
(Continued)

FOREIGN PATENT DOCUMENTS

CA    2240878    12/1998
DE    10110942    9/2002
(Continued)

OTHER PUBLICATIONS

"MP3 Recorder Download—MP3 Recorder—Record Audio Stream to MP3 or WAV," 2002, http://www.mp3-recorder.net.

(Continued)

*Primary Examiner* — Ryan Jakovac

(57) ABSTRACT

Methods and systems for initiating a collaboration between users are disclosed. An application server receives information pertaining to a call to a first user placed by a second user. A notification server sends notification of the call to a device associated with the first user. A network access server may then receive a response to the notification. Thereafter, the notification server sends a notification of a collaboration request to a device associated with the second user based on the response, and the application server initiates a collaboration between the first user and the second user based on a determination that the second user accepts the collaboration request.

77 Claims, 9 Drawing Sheets

(56) References Cited

U.S. PATENT DOCUMENTS

| | | | |
|---|---|---|---|
| 4,600,814 A | 7/1986 | Cunniff et al. | |
| 4,924,496 A | 5/1990 | Figa et al. | |
| 5,014,303 A | 5/1991 | Velius | |
| 5,113,431 A | 5/1992 | Horn | |
| 5,168,515 A * | 12/1992 | Gechter et al. | 379/265.04 |
| 5,222,125 A | 6/1993 | Creswell et al. | |
| 5,274,700 A | 12/1993 | Gechter et al. | |
| 5,327,486 A | 7/1994 | Wolff et al. | 379/93.23 |
| 5,329,578 A | 7/1994 | Brennen et al. | |
| 5,428,663 A | 6/1995 | Grimes et al. | |
| 5,440,624 A | 8/1995 | Schoof | |
| 5,483,586 A | 1/1996 | Sussman | |
| 5,533,096 A | 7/1996 | Bales | |
| 5,535,265 A | 7/1996 | Suwandhaputra | |
| 5,546,449 A | 8/1996 | Hogan et al. | |
| 5,548,636 A | 8/1996 | Bannister et al. | |
| 5,550,907 A | 8/1996 | Carlsen | |
| 5,583,564 A | 12/1996 | Rao et al. | |
| 5,586,173 A | 12/1996 | Misholi et al. | |
| 5,588,037 A | 12/1996 | Fuller et al. | |
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A | 5/1997 | Fitser et al. | 370/261 |
| 5,638,434 A | 6/1997 | Gottlieb et al. | |
| 5,649,105 A * | 7/1997 | Aldred et al. | 709/220 |
| 5,652,789 A | 7/1997 | Miner et al. | 379/201 |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,712,903 A | 1/1998 | Bartholomew et al. | |
| 5,715,444 A | 2/1998 | Danish et al. | |
| 5,717,863 A | 2/1998 | Adamson et al. | |
| 5,719,925 A | 2/1998 | Peoples | |
| 5,724,412 A | 3/1998 | Srinivasan | |
| 5,742,095 A | 4/1998 | Bryant et al. | |
| 5,742,668 A | 4/1998 | Pepe et al. | |
| 5,742,905 A | 4/1998 | Pepe et al. | |
| 5,745,561 A | 4/1998 | Baker et al. | |
| 5,745,884 A | 4/1998 | Carnegie et al. | |
| 5,751,800 A | 5/1998 | Ardon | |
| 5,752,191 A | 5/1998 | Fuller et al. | |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,875,437 A | 2/1999 | Atkins | |
| 5,892,900 A | 4/1999 | Ginter et al. | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,910,987 A | 6/1999 | Ginter et al. | |
| 5,916,302 A | 6/1999 | Dunn et al. | |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A | 8/1999 | Musk et al. | |
| 5,945,989 A | 8/1999 | Freishtat et al. | |
| 5,960,342 A | 9/1999 | Liem et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,011,579 A | 1/2000 | Newlin | |
| 6,018,571 A | 1/2000 | Langlois et al. | |
| 6,018,737 A | 1/2000 | Shah et al. | |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,078,658 A | 6/2000 | Yunoki | |
| 6,088,435 A | 7/2000 | Barber et al. | |
| 6,092,102 A | 7/2000 | Wagner | |
| 6,100,882 A | 8/2000 | Sharman et al. | |
| 6,122,348 A * | 9/2000 | French-St. George et al. | 379/88.23 |
| 6,134,318 A | 10/2000 | O'Neil | |
| 6,134,548 A | 10/2000 | Gottsman et al. | |
| 6,144,671 A | 11/2000 | Perinpanathan et al. | |
| 6,145,096 A | 11/2000 | Bereiter et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,243,366 B1 | 6/2001 | Bradley et al. | |
| 6,260,050 B1 | 7/2001 | Yost et al. | |
| 6,275,575 B1 | 8/2001 | Wu | |
| 6,282,522 B1 | 8/2001 | Davis et al. | |
| 6,296,062 B1 | 10/2001 | Gardell et al. | |
| 6,298,129 B1 | 10/2001 | Culver et al. | |
| 6,301,338 B1 | 10/2001 | Makela et al. | |
| 6,301,609 B1 | 10/2001 | Aravamudan et al. | 709/207 |
| 6,310,939 B1 | 10/2001 | Varney | |
| 6,310,947 B1 | 10/2001 | Polcyn | 379/211.01 |
| 6,324,269 B1 | 11/2001 | Malik | |
| 6,330,321 B2 | 12/2001 | Detampel et al. | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,371,484 B1 | 4/2002 | Yuan | |
| 6,373,817 B1 | 4/2002 | Kung et al. | |
| 6,373,930 B1 | 4/2002 | McConnell et al. | |
| 6,385,754 B1 | 5/2002 | Mizumoto et al. | |
| 6,389,113 B1 | 5/2002 | Silverman | |
| 6,404,873 B1 * | 6/2002 | Beyda et al. | 379/202.01 |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | 379/211.02 |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 * | 10/2002 | Theppasandra et al. | 455/445 |
| 6,477,374 B1 | 11/2002 | Shaffer et al. | 455/445 |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |

(56) References Cited

U.S. PATENT DOCUMENTS

| | | |
|---|---|---|
| 6,546,262 B1 | 4/2003 | Freadman |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. ......... 709/227 |
| 6,574,324 B1 | 6/2003 | Malik |
| 6,574,470 B1* | 6/2003 | Chow et al. .................. 455/417 |
| 6,577,622 B1 | 6/2003 | Schuster et al. ............. 370/352 |
| 6,577,720 B1 | 6/2003 | Sutter |
| 6,584,122 B1 | 6/2003 | Matthews et al. ............. 370/493 |
| 6,587,890 B1 | 7/2003 | Kult et al. |
| 6,590,603 B2 | 7/2003 | Sheldon et al. |
| 6,590,969 B1 | 7/2003 | Peters et al. |
| 6,593,352 B2 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary |
| 6,611,590 B1 | 8/2003 | Lu et al. |
| 6,614,786 B1 | 9/2003 | Byers ........................... 370/353 |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,694,351 B1 | 2/2004 | Shaffer et al. |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 | 6/2004 | Gross et al. |
| 6,754,227 B1 | 6/2004 | Petersen et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,772,436 B1 | 8/2004 | Doganata et al. |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Czuickshank |
| 6,816,469 B1 | 11/2004 | Kung et al. |
| 6,820,055 B2 | 11/2004 | Saindon et al. |
| 6,839,417 B2 | 1/2005 | Weisman et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,870,916 B2 | 3/2005 | Henrikson et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,937,713 B1 | 8/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,988,132 B2 | 1/2006 | Horvitz |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,069,298 B2 | 6/2006 | Zhu et al. |
| 7,076,528 B2 | 7/2006 | Premutico |
| 7,099,288 B1 | 8/2006 | Parker et al. |
| 7,102,643 B2 | 9/2006 | Moore et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,167,552 B1 | 1/2007 | Shaffer et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2* | 10/2007 | Castell et al. .................. 455/413 |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,353,258 B2 | 4/2008 | Washburn |
| 7,379,538 B1 | 5/2008 | Ali et al. |
| 7,418,090 B2 | 8/2008 | Reding et al. |
| 7,420,935 B2 | 9/2008 | Virolainen |
| 7,428,580 B2 | 9/2008 | Hullfish et al. |
| 7,546,337 B1* | 6/2009 | Crawford ...................... 709/203 |
| 7,561,872 B1 | 7/2009 | Koch et al. |
| 7,606,909 B1 | 10/2009 | Ely et al. |
| 7,616,747 B2 | 11/2009 | Wurster et al. |
| 7,912,193 B2 | 3/2011 | Chingon et al. |
| 8,166,173 B2 | 4/2012 | Low et al. |
| 8,238,380 B2 | 8/2012 | D'Angelo |
| 8,271,591 B2 | 9/2012 | Malik et al. |
| 8,467,502 B2 | 6/2013 | Sureka et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |

(56) References Cited

U.S. PATENT DOCUMENTS

| | | |
|---|---|---|
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0051919 A1 | 12/2001 | Mason |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076025 A1 | 6/2002 | Liversidge et al. |
| 2002/0076026 A1 | 6/2002 | Batten |
| 2002/0076027 A1* | 6/2002 | Bernnan et al. ......... 379/211.01 |
| 2002/0077082 A1* | 6/2002 | Cruickshank ................ 455/413 |
| 2002/0078153 A1 | 6/2002 | Chung et al. |
| 2002/0080942 A1 | 6/2002 | Clapper ................. 379/201.01 |
| 2002/0082028 A1 | 6/2002 | Wittenkamp |
| 2002/0082030 A1 | 6/2002 | Berndt et al. |
| 2002/0082997 A1 | 6/2002 | Kobata et al. |
| 2002/0083462 A1 | 6/2002 | Arnott ....................... 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0087469 A1 | 7/2002 | Ganesan et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra .......................... 370/389 |
| 2002/0115471 A1 | 8/2002 | DeLoye et al. |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz ................. 370/352 |
| 2003/0063732 A1 | 4/2003 | Mcknight et al. |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. ............. 709/204 |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| EP | 0818908 | 1/1998 |
| EP | 0818908 A3 | 1/1998 |
| EP | 1014630 | 6/2000 |
| EP | 1017210 | 7/2000 |
| EP | 1028578 | 8/2000 |
| EP | 1161063 | 12/2001 |
| EP | 1193617 | 4/2002 |
| EP | 1 235 387 | 8/2002 |
| EP | 1294201 | 3/2003 |
| JP | 59-169264 | 9/1984 |
| JP | 02-260750 | 10/1990 |
| JP | 4-336742 | 11/1992 |
| JP | 05-316233 | 11/1993 |
| JP | 6-113020 | 4/1994 |
| JP | 07-030664 | 1/1995 |
| JP | 7-058856 | 3/1995 |
| JP | 7-107171 | 4/1995 |
| JP | 7-107549 | 4/1995 |
| JP | 07-123098 | 5/1995 |
| JP | 08-149226 | 6/1996 |
| JP | 08-181763 | 7/1996 |

(56) References Cited

FOREIGN PATENT DOCUMENTS

| | | |
|---|---|---|
| JP | 8-298546 | 11/1996 |
| JP | 08-331642 | 12/1996 |
| JP | 09-064869 | 3/1997 |
| JP | 09-064977 | 3/1997 |
| JP | 09-083651 | 3/1997 |
| JP | 9-200350 | 7/1997 |
| JP | 9-223087 | 8/1997 |
| JP | 9-261759 | 10/1997 |
| JP | 09-294158 | 11/1997 |
| JP | 9-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-44257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-95/12948 | 5/1995 |
| WO | WO 96/14704 | 5/1996 |
| WO | WO-97/20423 | 6/1997 |
| WO | WO-97/33421 | 9/1997 |
| WO | WO-98/02007 | 1/1998 |
| WO | WO 99/22493 | 5/1999 |
| WO | 99/38309 | 7/1999 |
| WO | WO 00/45557 | 8/2000 |
| WO | WO-00/60837 | 10/2000 |
| WO | WO-00/64133 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | WO-01/52513 | 7/2001 |
| WO | WO 01/89212 | 11/2001 |
| WO | WO-02/25907 | 3/2002 |
| WO | WO-02/43338 | 5/2002 |

OTHER PUBLICATIONS

"FAQ Premium Home Answer" eVoice, http://content.evoice.com/wcs/signUp/FAQ_premHA_s01.htm.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration," VCON Escort and Cruiser, http://www.vide.gatech.edu/docs/share/.

"Instructions on Multipoint Application Sharing and Data Collaboration," VCON Escort and Cruiser with the RadVision MCU, http://www.vide.gatech.edu/docs/multi-share/.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone-The 'Dial Tone' for Web Communications Services," Webex, 2003.

Business Solutions/Professional, http://www.accessline.com/business_sol/bs_professional_body.html.

"Accessline Comms' Accessline Service, The One-Number Wonder," CommWeb, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps-Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MailNGen, "Next Generation Messaging for Service Providers," Data Connection Limited, Apr. 2003.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

(56) References Cited

OTHER PUBLICATIONS

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

"The Mobile Phone User Glide", http://www.mobileshop.org/usertech/wildfire.htm, printed Oct. 1, 2004.

Komowski, J., "Wildfire at Your Back and Call-A Voice-Activated Telephone Assistant That Minds You and Your Messages", http://www.lacba.org/lalawyer/techwidfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"MP3 Recorder Download-MP3 Recorder-Record Audio Stream to MP3 or WAV," 2002 http://www.mp3-recorder.net.

U.S. Appl. No. 09/828,679, filed Apr. 6, 2001, Reding et al.

U.S. Appl. No. 09/785,223, filed Feb. 16, 2001, Swingle et al.

"A Model for Presence and Instant Messaging", M. Day, et al. Fujitsu, Feb. 2000, Network Working Group, Request for Comments 2778.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

http://replay.waybackmachine,org/20020207142936/http://vvww.clicktocall.com/main.htm, Internet archive of website "www.clicktocall.com", dated Feb. 7, 2002.

Gaedke et al., Web Content Delivery to Heterogeneous Mobile Platforms, 1998, all pages.

Gessier et al., PDAs as mobile WWW browsers, 1995. all pages.

Kunz et al., An Architecture for Adaptive Mobile Applications, 1999, all pages.

Lauff et al., Multimedia Client Implementation on Personal Digital Assistants, 1997, all pages.

Chou, "Inside SSL: The Secure Sockets Layer Protocol," IT Professional, vol. 4, Issue 4, pp. 47-52, Jul./Aug. 2002.

Wagner, et al., "Analysis of the SSL 3.0 Protocol," Proceedings of the 2nd Conference on Proceedings of the Second USENIX Workshop on Electronic Commerce (WOEC'96) vol. 2, 12 pages, Nov. 1996.

\* cited by examiner

METHODS AND SYSTEMS FOR CPN TRIGGERED COLLABORATION

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/083,792, entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application Nos. 60/272,122 filed on Feb. 27, 2001, 60/272,167 filed on Feb. 27, 2001, 60/275,667 filed on Mar. 13, 2001, 60/275,719 filed on Mar. 13, 2001, 60/275,020 filed on Mar. 13, 2001, 60/275,031 filed on Mar. 13, 2001, and 60/276,505 filed on Mar. 19, 2001, and all of which are expressly incorporated herein by reference in their entirety.

Applicants also claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR CONFIGURING AND PROVIDING CONFERENCE CALLS"; U.S. patent application Ser. No. 10/720,859, entitled "METHODS AND SYSTEMS FOR CONFERENCE CALL BUFFERING"; U.S. patent application Ser. No. 10/721,009, entitled "METHODS AND SYSTEMS FOR COMPUTER ENHANCED CONFERENCE CALLING"; U.S. patent application Ser. No. 10/720,943, entitled "METHODS AND SYSTEMS FOR REMOTE CALL ESTABLISHMENT"; U.S. patent application Ser. No. 10/721,005, entitled "METHODS AND SYSTEMS FOR CALL MANAGEMENT WITH USER INTERVENTION"; U.S. patent application Ser. No. 10/720,868, entitled "METHODS AND SYSTEMS FOR DIRECTORY INFORMATION LOOKUP"; U.S. patent application Ser. No. 10/720,970, entitled "METHODS AND SYSTEMS FOR AUTOMATIC COMMUNICATION LINE MANAGEMENT BASED ON DEVICE LOCATION"; U.S. patent application Ser. No. 10/720,952, entitled "METHODS AND SYSTEMS FOR ADAPTIVE MESSAGE AND CALL NOTIFICATION"; U.S. patent application Ser. No. 10/720,870, entitled "METHODS AND SYSTEMS FOR A CALL LOG"; U.S. patent application Ser. No. 10/720,633, entitled "METHODS AND SYSTEMS FOR AUTOMATIC FORWARDING OF CALLS TO A PREFERRED DEVICE"; U.S. patent application Ser. No. 10/720,971, entitled "METHODS AND SYSTEMS FOR LINE MANAGEMENT"; U.S. patent application Ser. No. 10/720,784, entitled "METHODS AND SYSTEMS FOR CONTACT MANAGEMENT"; U.S. patent application Ser. No. 10/720,920, entitled "METHODS AND SYSTEMS FOR NOTIFICATION OF CALL TO PHONE DEVICE"; U.S. patent application Ser. No. 10/720,825, entitled "METHODS AND SYSTEMS FOR SINGLE NUMBER TEXT MESSAGING"; U.S. patent application Ser. No. 10/720,944, entitled "METHODS AND SYSTEMS FOR MULTI-USER SELECTIVE NOTIFICATION"; and U.S. patent application Ser. No. 10/720,938, entitled "METHODS AND SYSTEMS FOR PREEMPTIVE REJECTION OF CALLS", all of which are expressly incorporated herein by reference in their entirety.

TECHNICAL FIELD

The present invention relates generally to data processing systems and, more particularly, to a method and system for using calling party number (CPN) information to initiate a collaboration between a calling party and a called party.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating such as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

A user may also wish to treat an incoming phone call differently dependent on the identity of the caller. For example, if a user receives a call from a caller to whom the user does not want to speak at the moment, the user may want to send that call directly to voice mail. Also, if a user receives a call from a number that displays no caller ID information or that the user otherwise does not recognize, the user may wish to somehow specially treat the call, because the caller is a potential telemarketer.

Current call management systems make it possible for a user to receive notification of a call on a communications device, and then to either take the call or divert it to voice mail to the user's discretion. Current call management systems also make it possible to automatically intercept and specially treat a call that displays no caller ID information. Current call management systems, however, do not enable a user to perform other functions as a call is being received, such as initiating a collaboration session with the calling party.

SUMMARY OF THE INVENTION

Methods and systems consistent with the present invention initiate a collaboration between users. An application server receives information pertaining to a call to a first user placed by a second user. A notification server sends notification of the call to a device associated with the first user. A network access server may then receive a response to the notification. Thereafter, the notification server sends a notification of a collaboration request to a device associated with the second user based on the response. The call is connected based on a response to the collaboration request.

Other methods and systems consistent with the present invention also initiate a collaboration between users. An application server receives information pertaining to a call to a first user placed by a second user. A notification server sends notification of the call to a device associated with the first user. A network access server may then receive a response to the notification. Thereafter, the notification server sends a notification of a collaboration request to a device associated with the second user based on the response, and the application server initiates a collaboration between the first user and the second user based on a determination that the second user accepts the collaboration request.

Other methods and systems consistent with the present invention also initiate a collaboration between users. A device associated with a first user receives notification of a call to the first user placed by a second user. The device also receives input from the first user indicative of a response to the notification. Thereafter, the device sends, to a service center, response information reflective of a response to the notification. The service center sends a notification of a collaboration request to a device associated with the second user based on the response information, and initiates a collaboration between the first user and the second user based on a determination that the second user accepts the collaboration request.

Other methods and systems consistent with the present invention initiate a collaboration between a first user and a second user. A device associated with a second user receives, from a service center, notification of a collaboration request. Prior to the receiving, the service center receives notification of a call to a first user placed by the second user, sends a notification of the call to a device associated with the first user, receives a response to the notification of the call, and sends the notification of the collaboration request based on the response to the notification of the call. The device associated with the second user also receives input from the second user indicative of a response to the notification of the collaboration request. Moreover, the device associated with the second user sends, to the service center, response information reflective of the response to the notification of the collaboration request. The service center thereafter initiates a collaboration between the first user and the second user based on a determination that the second user accepts the collaboration request.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the present invention initiate a collaboration between users. A collaboration enables multiple users to share data interactively. For example, users participating in a collaborative session may share data in various ways, such as whiteboards, document sharing, and/or application sharing. A whiteboard is essentially an electronic chalkboard that allows users at various sites to simultaneously write and draw on an on-screen notepad viewed by multiple users. Document sharing may refer, for example, to the ability to allow one or more documents to be viewed, edited, saved, or replaced by multiple users participating in a collaborative session. Application sharing may refer, for example, to the ability to allow one or more applications to be viewed or otherwise controlled by multiple users participating in a collaborative session Consistent with the present invention, an application server receives information pertaining to a call to a first user placed by a second user. A notification server sends notification of the call to a device associated with the first user. A network access server may then receive a response to the notification. Thereafter, the notification server sends a notification of a collaboration request to a device associated with the second user based on the response, and the application server initiates a collaboration between the first user and the second user based on a determination that the second user accepts the collaboration request.

Network Environment

Figure 1:
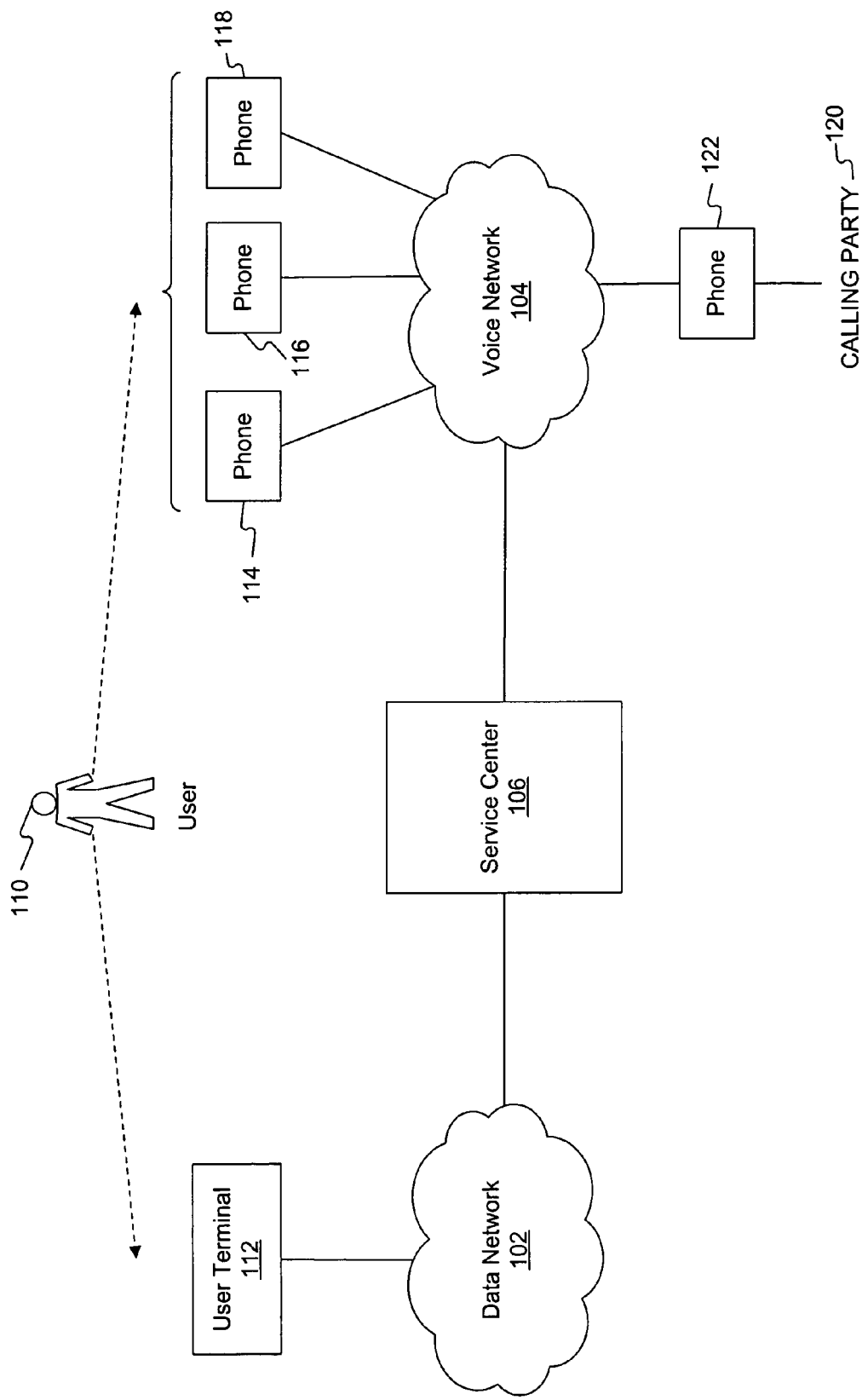
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, the voice network may be a video over broadband network, such as, for example, a network for providing two-way video communications. In another example, the voice network may be a wireless broadband network, such as, for example, a network using WiFi (i.e., IEEE 802.11(b) and/or (g)). In yet another example, the voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 with an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, to enable direct communication with service center 106. Also, user terminal 112 may communicate with service center 106 via a proxy. One of ordinary skill in the art will appreciate that while FIG. 1 depicts only one user terminal 112, multiple user terminals 112 may exist in environment 100, for use by user 110 or other users (not shown).

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
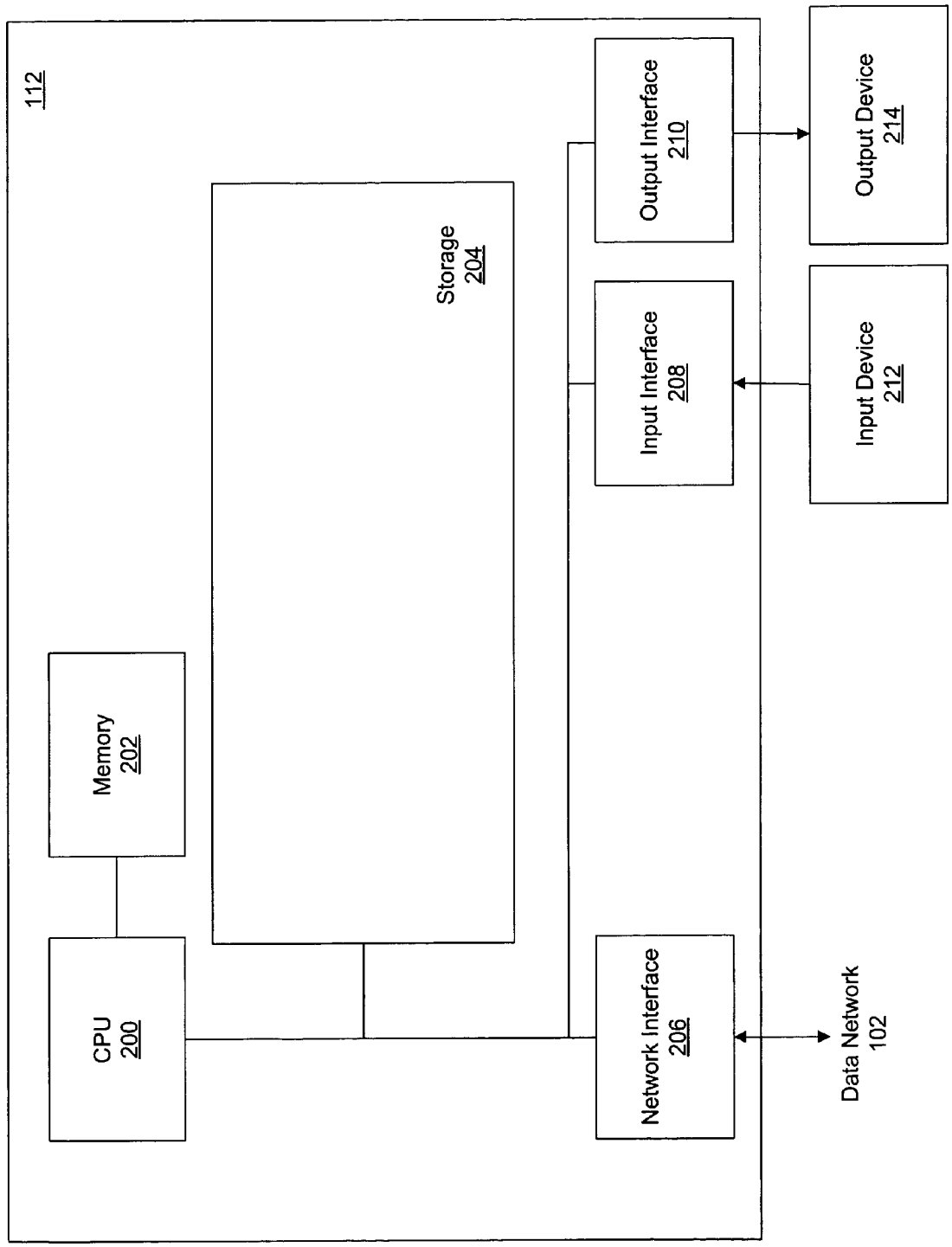
FIG. 2 is a diagram of an exemplary user terminal, consistent with the principals of the present invention.

FIG. 2 is a block diagram of a user terminal consistent with the present invention. User terminal 112 may include a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
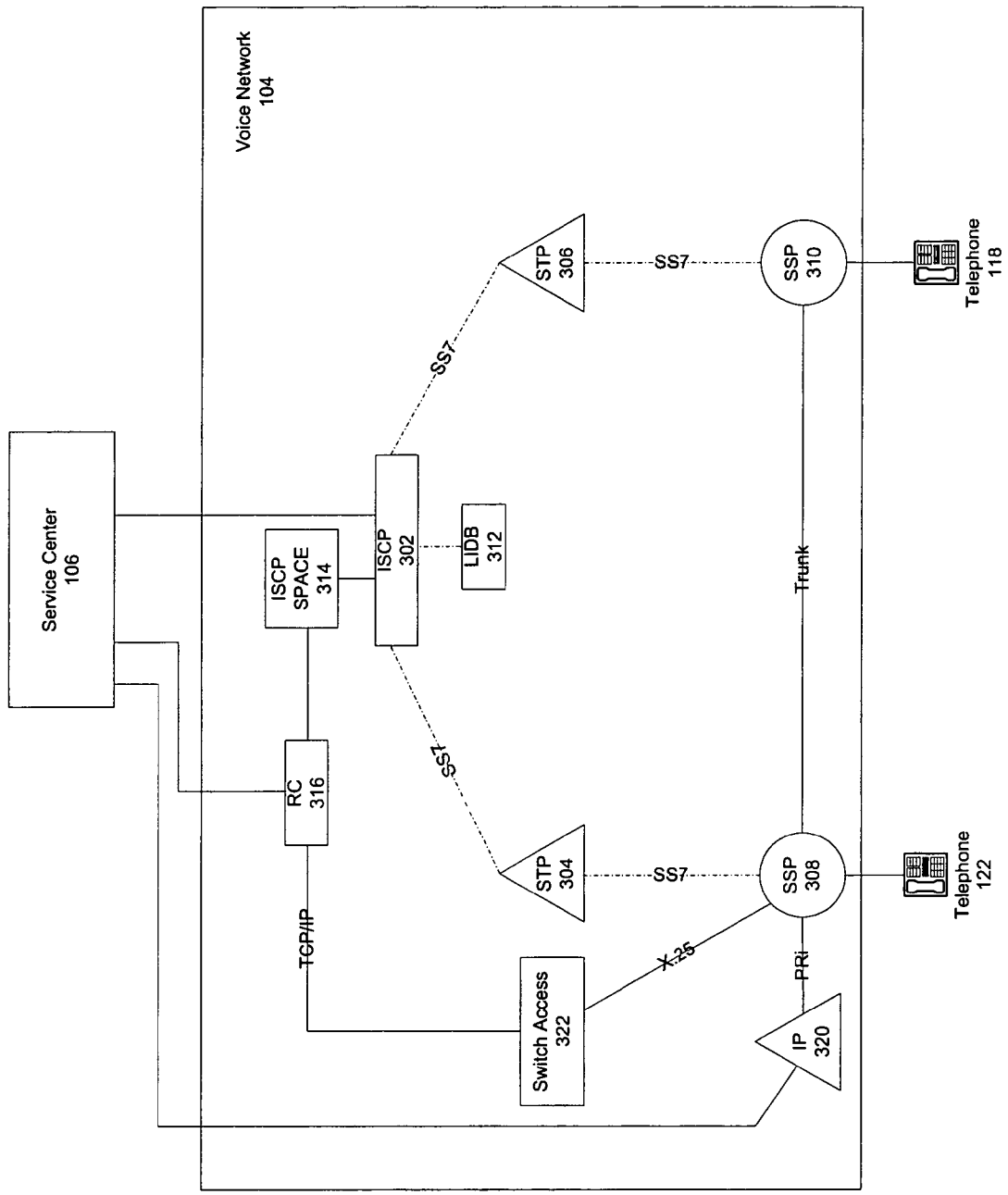
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, an Intelligent Peripheral (IP) 320, and a switch access 322. Although this embodiment voice network 104 is described as a PSTN, as discussed above in other embodiments, the voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection through ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GDI) for TCP/IP.

STPs 304 and 306 relay SS7 messages within voice network 104. For example, STP 304 may route SS7 messages between SSPs 308 and 310. STP 304 or 306 may be implemented using known hardware and software from manufacturers such as NORTEL™ and LUCENT Technologies™.

SSPs 308 and 310 provide an interface between voice network 104 and phones 122 and 118, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information. Although in this figure LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of the ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in the ISCP SPACE 314 such that the records may be updated and sent to the ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, the voice network 104 may include one or more recent change engines 316 such as, for example, an Enterprise Recent Change engine (eRC); an Assignment, Activation, and Inventory System (AAIS); or a multi-services platform (MSP). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AAIS is used for providing updates to ISCPs 302.

Updates sent to SSPs 308 or 310 may be sent from the recent change engine 316 via a switch access 322 that may, for example, convert the updates into the appropriate protocol for SSP 308 or 310. For example, recent change engine 316 may send updates to SSPs 308 or 310 via TCP/IP. Switch access 322 may then convert the updates from TCP/IP to X.25. This switch access 322 may be implemented using hardware and/or software. These connections may include any number of elements, such as, for example, switches, routers, hubs, etc. and may be, for example, an internal data network for voice network 104.

Voice network 104 may also include one or more intelligent peripherals (IP). For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between SSP 308 and IP 320 may use the Primary Rate interface (PRi) (e.g., the 1129 protocol) protocol. Additionally, IP 320 may be capable of sending and receiving information to/from Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for voice network 104.

Figure 4:
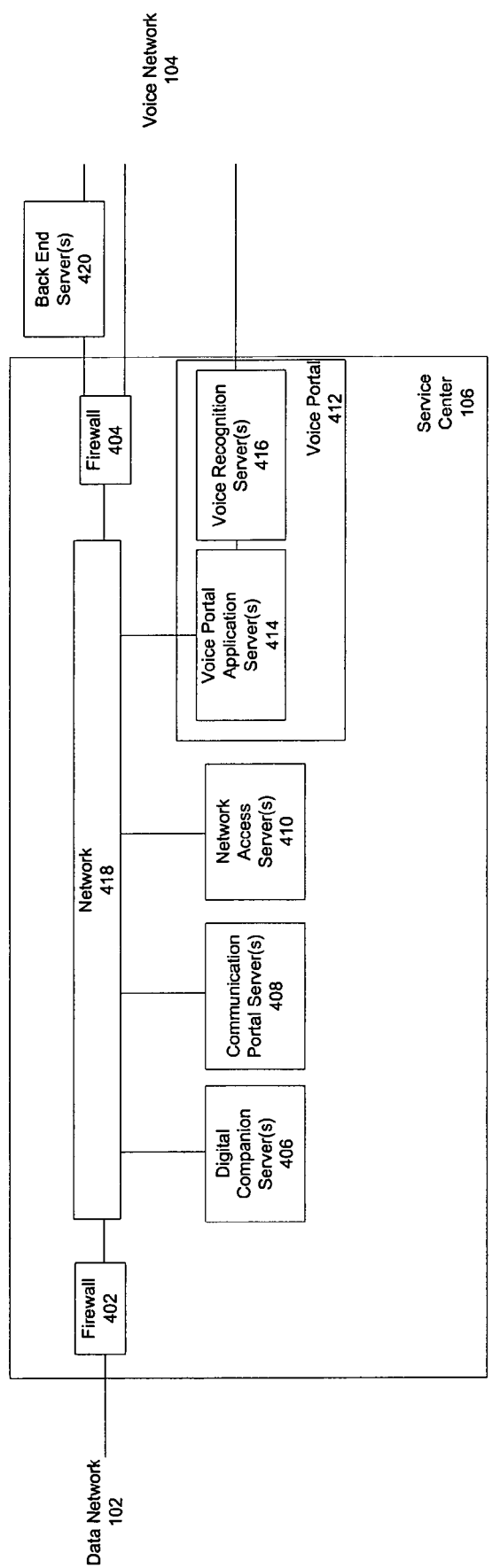
FIG. 4 is a block diagram of a service center, consistent with the principles of the present invention.

FIG. 4 is a block diagram of a service center 106, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, CPN triggered collaboration, etc. A customer may be a user that subscribes to various services of service center 106.

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by service center 106. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
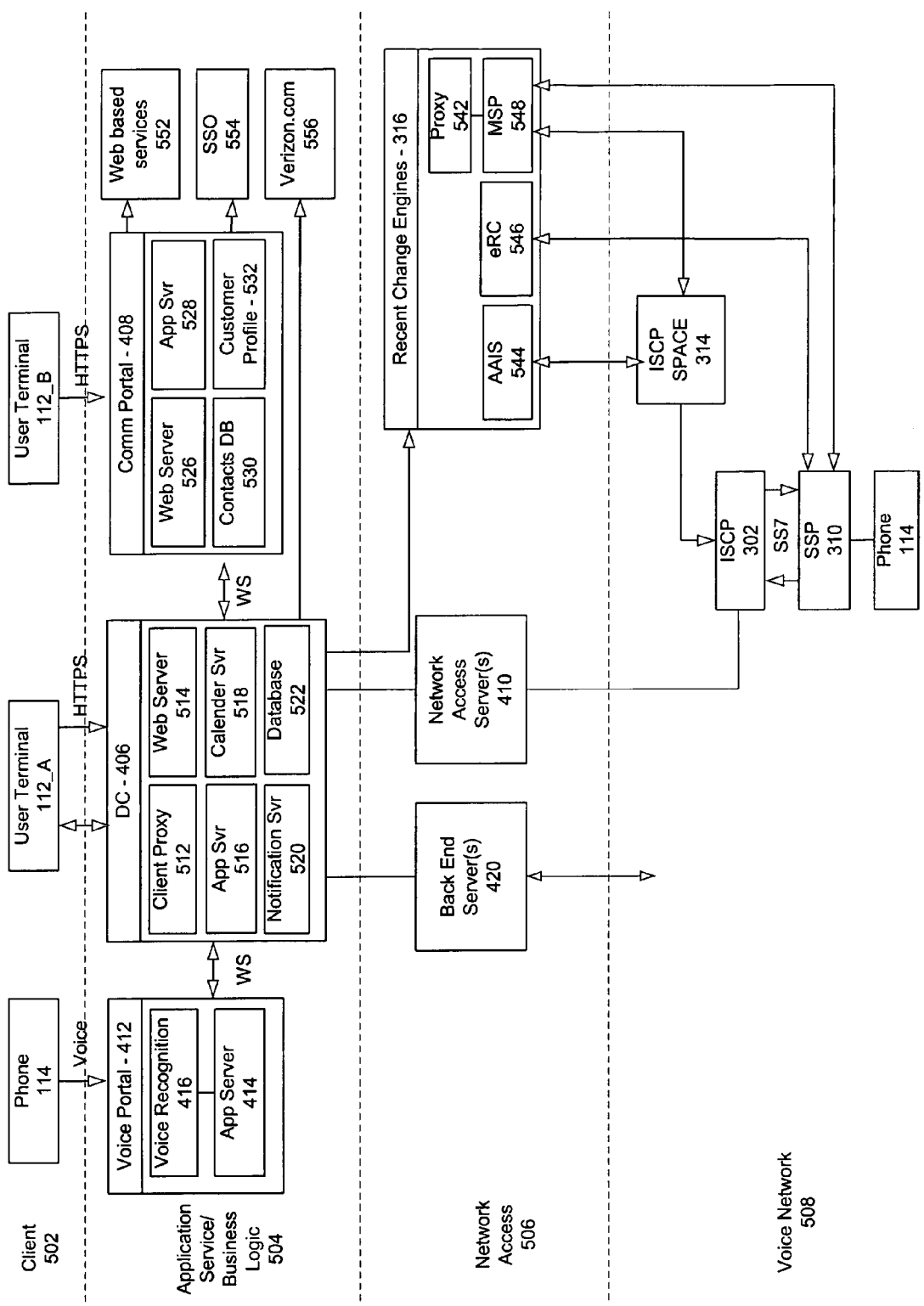
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes user terminals 112_A and 112_B that a user may use to send and/or receive information to/from the service center 106. Additionally, client side 502 plane includes the user's phone(s) 114. As discussed above, user terminals 112 may be any type of device a user may use for communicating with service center 106. For example, user terminal 112_A may be a PDA running a program for communicating with service center 106, while user terminal 112_B may be a desktop type computer running a web browser for communicating with service center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy function 512, a web server function 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy function 512. Also, if client proxy function 512 is included on a separate server, for example, an additional firewall may be provided between client proxy function 512 and the other digital companion servers to provide additional security.

Web server function 514 receives traffic over the data network 102 from a customer. For example, web server function 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, enabling CPN triggered collaboration, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, notification server function 520, at the direction of application server function 516, may send a notification to user terminal 112 that the user is presently receiving a phone call at user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information in databases useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over the data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages web page. Application server function 528 could then contact these external services 552 to retrieve information, such as an address for a person in the user's address book.

In another example, application server function 528 of the communication portal 408 may interface a single sign on (SSO) server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, enabling CPN triggered collaboration, etc.

Contacts database function 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database function 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 of the architecture may also include a voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between the digital companion servers 406 and voice recognition function 416. Additionally, application server function 414 may be included on a separate server, included in the hardware and software providing voice recognition function 416, included in digital companion servers 406, etc.

Network access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in the voice network 104. In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in service center 106 and may provide the hardware and software for sending and receiving information to voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to the service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may interface service center 106 with a Reverse Directory Assistance Gateway (RDA Gateway) of voice network 104. An RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by the service center 106 and those used by the wireless voice network.

In yet another example, back end server(s) 420 may include a conference blasting server for instructing a conference bridge in voice network 106 to dial out via an SSP to the participants of a voice conference. Alternatively, for example, the back end server(s) may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a Short Message Service (SMS) gateway in voice network 104. This may be used to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

System Operation

Figure 6A:
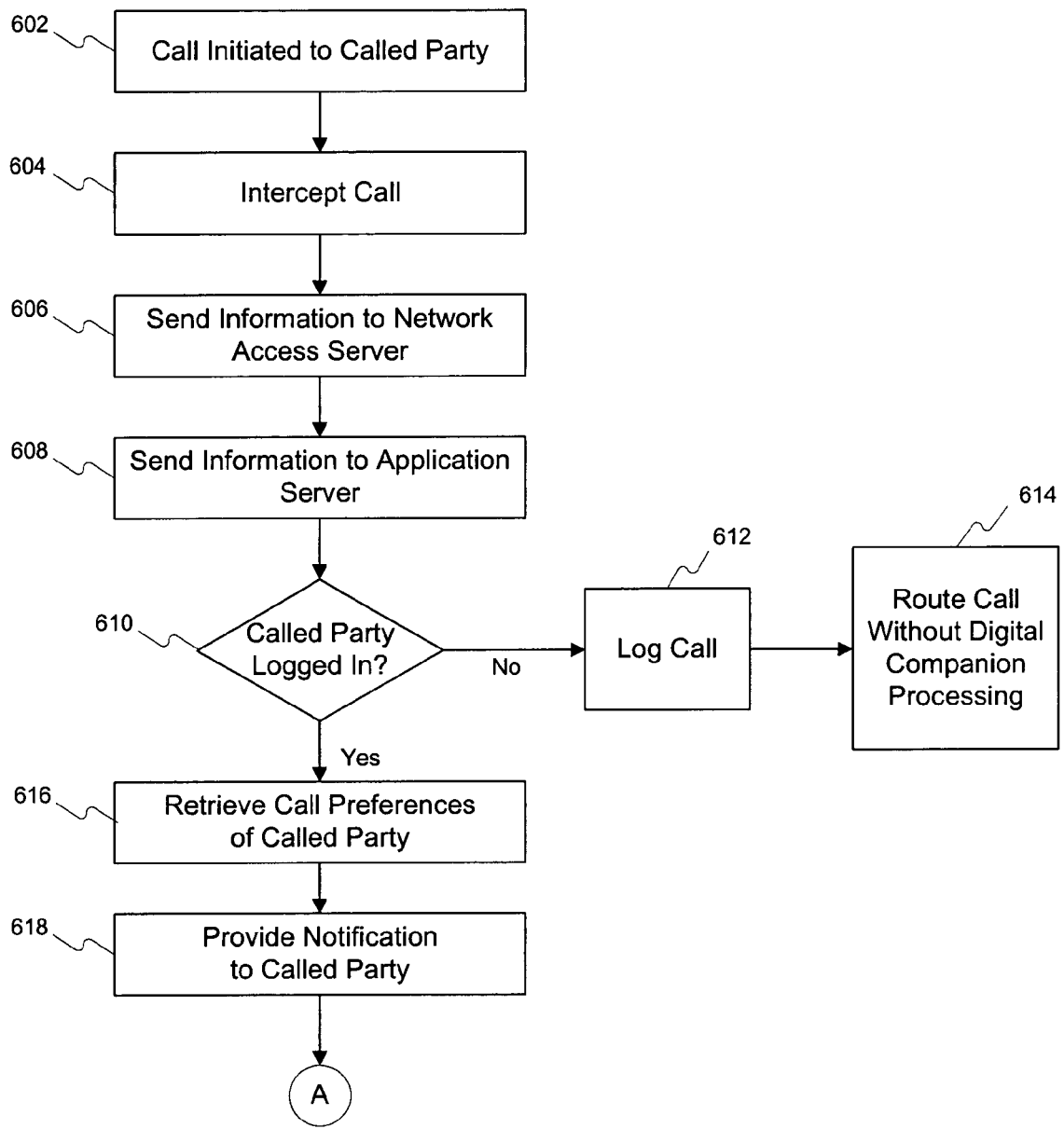
FIGS. 6A and 6B comprise a diagram of an exemplary flowchart of a method for initiating a collaboration session consistent with the principles of the present invention.
Figure 6B:
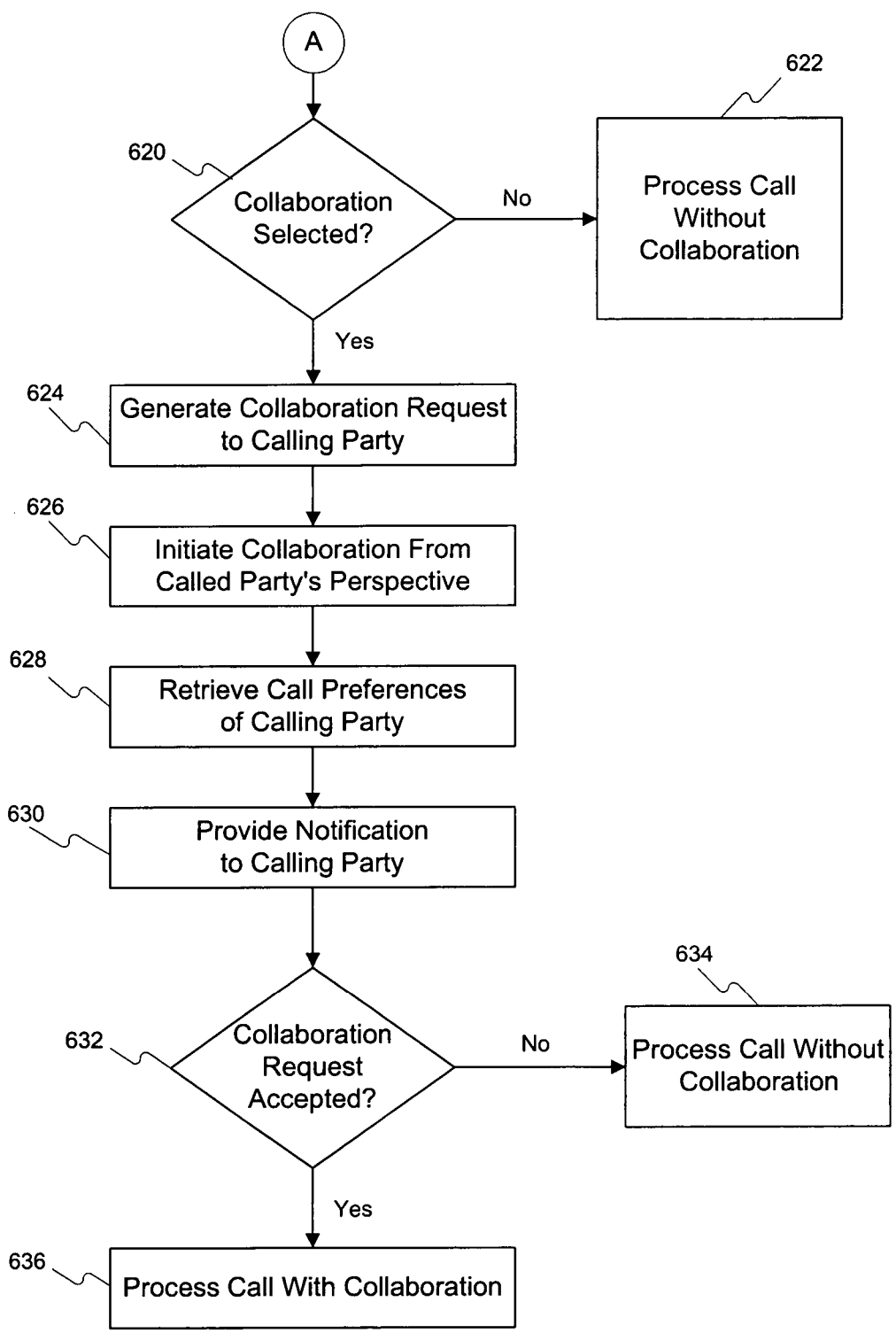

FIGS. 6A and 6B comprise a diagram of an exemplary flowchart of a method for initiating a collaboration session in a manner consistent with the present invention. Although the steps of the flowchart are described in a particular order, one skilled in the art will appreciate that these steps may be performed in a modified or different order. Further, one or more of the steps in FIGS. 6A and 6B may be performed concurrently or in parallel.

As illustrated in FIGS. 6A and 6B, a calling party first initiates a call to a called party (step 602). For example, calling party 120 may use a phone, such as phone 122, to call a customer, such as user 110. In one embodiment, the call may be routed from a phone to a voice network, such as voice network 104, where an SSP 308 or 310 may intercept the call (step 604). SSP 308 or 310 may intercept the call because it encountered a trigger, such as a terminating attempt trigger or a specific digit string trigger, associated with the call. For example, a trigger may be set at SSP 308 or 310 on each of the lines corresponding to a digital companion customer. In this manner, a trigger is set to detect calls received at the SSP that are directed to telephone numbers of digital companion customers.

After intercepting the call, SSP 308 or 310 sends a query to ISCP 302 requesting further instructions. In response, ISCP 302 sends call information to a network access server 410 (step 606). In one embodiment, the call information may be sent to network access server 410 via a Generic Data Interface (GDI), using a message structure associated with GDI (e.g., GetData, SendData, or InvokeApp). The call information sent to network access server 410 may also be sent in an encrypted form.

The call information may include, for example, call state data, a call intercept parameter, a voice mail parameter, time zone data, user ID, called number data, calling name data, calling number data, and calling party number (CPN) presentation information. One of ordinary skill in the art will appreciate that additional information may be included with the call information, or that some of the previously noted information may be omitted from the call information.

Call state data may provide the current call state based on processing (e.g., AIN processing) that has already occurred for the call. For example, some possible values for call state data may be indicative of a call being authorized for termination, a call being to a call intercept (CI) service node or IP, a call being from a CI service node or IP, a call being a priority call from the CI service node or IP, a call having a CI error encountered on a call to a CI service node or IP, or a call being on the first leg of a click-to-dial call.

The call intercept parameter identifies when a customer subscribes to a call intercept feature. In one embodiment, a call intercept feature allows a customer to stop invalid numbers that typically appear as "unavailable," "private," "anonymous," or "out of area" on a caller ID display. The feature may tell callers that unidentified calls are not accepted and ask them to record a name. If an unidentified caller does not record a name or enter an override code, the called party's phone will not ring, thus eliminating interruptions from unidentified callers.

The voice mail parameter identifies when a subscriber has voice mail capability. Time zone data refers to the customer's time zone. Called number data refers to the number of a called device associated with the subscriber. User ID refers to a parameter that may have one of two values. If a distinctive ring feature is present, then user ID is set to a primary number value. If no such feature is present, then user ID is set to the same value as the called number. Distinctive ring, for example, may provide a customer with additional telephone numbers on a single line, with their own unique ringing pattern. A customer's primary number is the main number associated with the line.

Calling number data refers to the number of the caller. This parameter may contain such a number when it is available. In addition, the parameter may contain a calling party address when the information is made available by a previously executed AIN service. Otherwise, the calling number parameter may include some arbitrary string of digits or characters (e.g., ten zeros) when the caller ID information does or does not match a particular format.

Calling name data refers to the name of the calling party. This parameter may be retrieved, for example, by ISCP 302 from a database such as LIDB 312. It may be typically possible to retrieve the calling name when the database was populated with this data by a previously executed AIN service. If the calling name is not successfully retrieved, then the calling name parameter may include, for example, an arbitrary string of digits or characters (e.g., zeros) indicative of situations where there was no response from LIDB 312, there was an erroneous response from LIDB 312, there was no name returned from LIDB 312, the format of the caller ID is not in conformance, or the caller ID presentation is restricted.

ISCP 302 also sends an announcement to an SSP where the call is being handled. The announcement can be some kind of recording that is played for the calling party. This announcement has the effects of preventing a call timer in the SSP from expiring and giving the calling party an indication that the call is progressing. The ISCP 302 may continue to cause the announcement to be played while waiting for a response from the network access server 410.

Upon receiving the call information from the ISCP 302, network access server 410 may decrypt the information, if necessary, and forward the received information to application server 516 (step 608). Application server 516 may then determine whether the customer associated with the triggered phone number (e.g., destination/dialed phone number) is logged into a digital companion server 406 (step 610). Application server 516 makes this determination, for example, by performing a lookup in a database, such as database 522, using the called number as an index. Based on the called number, application server 516 can determine a digital companion customer ID. This digital companion customer ID may have a number of access points (e.g., user terminals 112) associated with it. Application server 516 may lookup entries in database 522 that correspond to the digital companion customer ID to determine whether the customer is currently logged onto a digital companion server 406 using any access points. For example, whenever a customer is logged on using an access point, an indication of such is stored in database 522. If application server 516 finds such an indication in database 522, then it knows that the customer is logged on, and it knows which access point the customer is using.

If the customer is not logged on anywhere, then there is no way for service center 106 to communicate with the customer using digital companion operations. Instead, service center 106 logs the call (step 612). When the customer logs in at a later time, the customer is provided with an indication that the customer was called. Calls may be logged, for example, in database 522 or in other storage on digital companion server 406 or communication portal server 408. The call may be subsequently routed without digital companion processing (e.g., call may be completed as dialed, if possible) (step 614).

If the customer is logged on, then application server 516 retrieves call preference information from a database (step 616). In one embodiment, the database storing this call preference information may be database 522, customer profile database 532, or another database used to store customer-related data. The call preference information may include, for example, call block lists, lists of forwarding devices or telephone numbers, voice mail preferences, lists of recordings that the customer can set as pre-recorded messages, etc.

Application server 516 may also proceed to determine whether the call intercept feature and/or voice mail features are enabled for the called party by examining the call information received from the network access server 410. Application server 516 makes this determination so that it knows which options should be made available to a called party. One of ordinary skill in the art will appreciate that the application server may also check for any other feature that can be enabled and disabled (e.g., call screening, collaboration). Application server 516 also determines the CPN presentation value associated with the call by examining the call information received from the network access server 410. The CPN presentation value is determined so that the calling party's CPN information can either be displayed or not displayed for the customer.

Thereafter, application server 516 may provide the collected information (e.g., call information, call preference information, and access point information) to notification server 520 and instruct notification server 520 to send an RTCM notification to the customer associated with the called number (e.g., by providing an indication of the access point that the customer is using to the notification server 520). Notification server 520 has open connections to all devices (e.g., user terminals 112) that are logged on. When notification server 520 receives information from application server 516, it uses the information to route an RTCM notification to the customer at the appropriate access point (step 618). In one embodiment, the RTCM notification may be sent using a protocol such as HTTP (Hypertext Transfer Protocol), Java, or a similar protocol.

The RTCM notification may be a notification of the incoming call to the customer. The notification may include a display having a number of customer-selectable buttons associated with it that enable the customer to manage a call in real-time. For example, the notification may have different buttons that permit a customer to send a call to voice mail, send a call received on one device to another device, perform a call screening operation, accept a call, play an announcement, place a call on hold, schedule a call back operation, perform an automatic call back operation, perform a call block operation, bridge a caller onto the current call (e.g., initiate a conference call), or initiate a collaborative session.

The notification may provide the customer with different options dependent on the features for which the customer is authorized and has enabled. For example, if the customer does not subscribe to the call intercept feature, then the RTCM notification will not include a user-selectable area corresponding to the telemarketer zap operation. If the customer does not have voice mail enabled, then the RTCM notification will not include a user-selectable area corresponding to voice mail. One of ordinary skill in the art will appreciate that any feature that can be enabled and disabled may be used as a basis for altering the RTCM notification (e.g., call screening, conference call, etc.). If the customer does not have collaboration enabled, then the notification will not include a user-selectable area allowing the customer to initiate a collaborative session.

In addition, if application server 516 detects that the calling party is not a digital companion customer, then the called party may not be given the option of initiating a collaborative session. Application server 516 may determine whether the calling party is a digital companion customer, for example, by performing a lookup in database 522 (or another database storing customer information) using the calling party number information or calling party name information from the previously received call information (see steps 606 and 608).

Once it has received the RTCM notification, the customer's selected device displays the RTCM notification, including the customer-selectable buttons associated with it. The device does not yet ring. Even though the device is not yet ringing, the caller may hear on the calling device (e.g., the phone or other device used to place the call) a ringing tone or an announcement indicating that the call is proceeding. Network access server 410 then waits for a response from the customer. Response information may include, for example, call disposition information, forwarding number information, nature of forwarding number information, carrier access code, announcement type, and ring cadence. One of ordinary skill in the art will appreciate that additional data may be included with the response data, or that some of the previously noted data may be omitted from the response data.

Call disposition information may provide an indication of the customer's choice for how the call should be handled. For example, call disposition information may include an indication of sending a call to voice mail, sending a call received on one device to another device (e.g., call forwarding), performing a call screening operation, accepting a call, playing an announcement, placing a call on hold, scheduling a call back operation, performing an automatic call back operation, performing a call block operation, bridging a caller onto the current call, or initiating a collaborative session.

When a call forwarding operation is invoked, forwarding number information includes a number to which the call should be forwarded. Nature of forwarding number information identifies the nature of the call forwarding number. For example, a number may be a national number or an international number.

Carrier access code may be a sequence of digits indicative of a specific carrier when a call should be routed using the specific carrier.

Announcement type identifies an announcement that should be played to the caller. This parameter, for example, may be used when the customer selects the play announcement option.

Ring cadence may be indicative of the ring cadence value that should be applied for the call. For example, different values may be used to designate normal cadence; short, short cadence; and short, short, long cadence; or any other possible cadences.

If, after a predetermined period of time, notification server 520 has not received a response, then the call is accepted for the device receiving the RTCM notification. For example, after the period of time, the RTCM notification may disappear from the device's display and the device may start ringing. The customer may answer the call if he or she is available and chooses to do so. One of ordinary skill in the art will appreciate that other default actions may occur instead of allowing the call to go through. For example, a busy signal may be played, the call may be sent to voice mail, the call may be forwarded to a preferred forwarding number, an announcement may be played, etc.

If the customer responds by selecting one of the RTCM options, then the RTCM notification disappears from the display, and the network access server 410 receives the response and encrypts it, if necessary. If the customer selects an option other than collaboration (step 620—No), then network access server 410 proceeds to instruct ISCP 302 to route the incoming call based on the response from the customer (step 622). Further information on this call routing may be found in U.S. patent application Ser. No. 10/721,005, which has already been incorporated by reference.

If the customer selects the collaboration option (step 620—Yes), then a collaboration request to the calling party is generated (step 624). For example, upon receiving response information indicating that collaboration has been selected, network access server 410 may send application server 516 information indicating that an attempt to establish a collaborative session between the called party and the calling party should be made. Application server 516 may proceed to initiate a collaboration from the perspective of the called party (step 626). For example, application server 516 may launch collaboration software (e.g., WebEx, NetMeeting, etc.) from the viewpoint of the called party. More particularly, application server 516 may open collaboration software that is stored, for example, local to application server 516 or on a user-terminal 112 being used by the called party. Thereafter, features associated with the collaboration software that cause data to be shared may be activated. The called party may also select data to be shared in a collaborative session and otherwise configure the collaboration software in preparation for a collaborative session between the called party and the calling party.

Generally, a collaboration may enable multiple users to share data interactively. For example, users participating in a collaborative session may share data in various ways, such as whiteboards, document sharing, and/or application sharing. A whiteboard is essentially an electronic chalkboard that allows users at various sites to simultaneously write and draw on an on-screen notepad viewed by multiple users (e.g., collaborate in real-time with others using graphic information). With a whiteboard, a user may review, create, and update graphic information; manipulate contents by clicking, dragging, and dropping information on the whiteboard; cut, copy, and paste information from other applications onto the whiteboard; save whiteboard contents for future reference; and otherwise edit or modify information on the whiteboard so that other users can view the changes. Document sharing may refer, for example, to the ability to allow one or more documents to be viewed, edited, saved, or replaced by multiple users participating in a collaborative session. Application sharing may refer, for example, to the ability to allow one or more applications to be viewed or otherwise controlled by multiple users participating in a collaborative session. Whiteboards, document sharing, and application sharing may be used in conjunction with an audio or videoconferencing connection. These connections may be separate calls or be transmitted in the same call as the data associated with the whiteboards, document sharing, and/or application sharing.

Application server 516 may also retrieve call preference information of the calling party from a database (step 628). This retrieval may be similar to the retrieval of call preference information of the called party performed in step 616 above. Once the call preferences have been retrieved, application server 516 may cause a notification to be sent to the calling party (step 630). For example, application server 516 may instruct notification server 520 to provide a notification to the calling party at the device used to place the call, if possible. This may be done by instructing notification server 520 to send the notification to the device that corresponds to the calling party number. Alternatively, application server 516 may instruct notification server 520 to provide a notification to the calling party at a device designated by the calling party to receive such notifications. For example, a calling party may designate a device equipped to participate in a collaboration. The designated device may or may not be the same device used to place the call. Application server 516 and/or notification server 520 may use the retrieved call preferences to determine whether a device has been designated in this manner.

Application server 516 may use the information retrieved in step 628 to provide the collaboration software with an identification of a device to be used by the calling party in the collaboration. The collaboration software may use this identification information to initiate an attempted collaboration connection between a device of the called party and a device of the calling party.

The notification to the calling party of step 630 may present the calling party with the option of accepting the request for collaboration from the called party. For example, the notification may include a user-selectable area for accepting or declining the collaboration request. If the calling party does not accept the collaboration request (step 632=No), then the call is processed without collaboration (step 634). For example, network access server 410 may receive response information from the device of the calling party that received the notification. The response information may include information indicative of the collaboration request denial. In response, network access server 410 may instruct application server 516 to stop the collaboration that was launched from the perspective of the called party. Network access server 410 may also proceed to instruct ISCP 302 to connect the call between the called party and the calling party. Thereafter, the called party and calling party may communicate in a suitable manner.

If the calling party accepts the collaboration request (step 632—Yes), then the call is processed with collaboration (step 636). For example, network access server 410 may receive response information from the device of the calling party that received the notification. The response information may include information indicative of the collaboration request acceptance. In response, network access server 410 may instruct application server 516 to initiate the collaboration from the calling party's perspective using the aforementioned collaboration software. For example, application server 516 may open collaboration software that is stored, for example, on the device to be used by the calling party in the collaboration, and cause the collaboration software to automatically complete the collaboration connection between the device of the called party and the device of the calling party. Alternatively, once application server 516 has opened the collaboration software, the calling party may be prompted to provide additional input to complete the collaboration connection. One of ordinary skill in the art will appreciate that a collaboration connection may be on a data network, such as data network 102, or on a voice network capable of carrying data.

In addition to the collaboration being initiated from the calling party's perspective, network access server 410 may also proceed to instruct ISCP 302 to connect the call between the called party and the calling party. In this manner, the called party and the calling party have both a call connection and a collaboration between them. Alternatively, the collaboration may include a voice connection or videoconferencing connection, and it may not be necessary to connect the original call. Instead, there would only need to be a collaboration.

Figure 7:
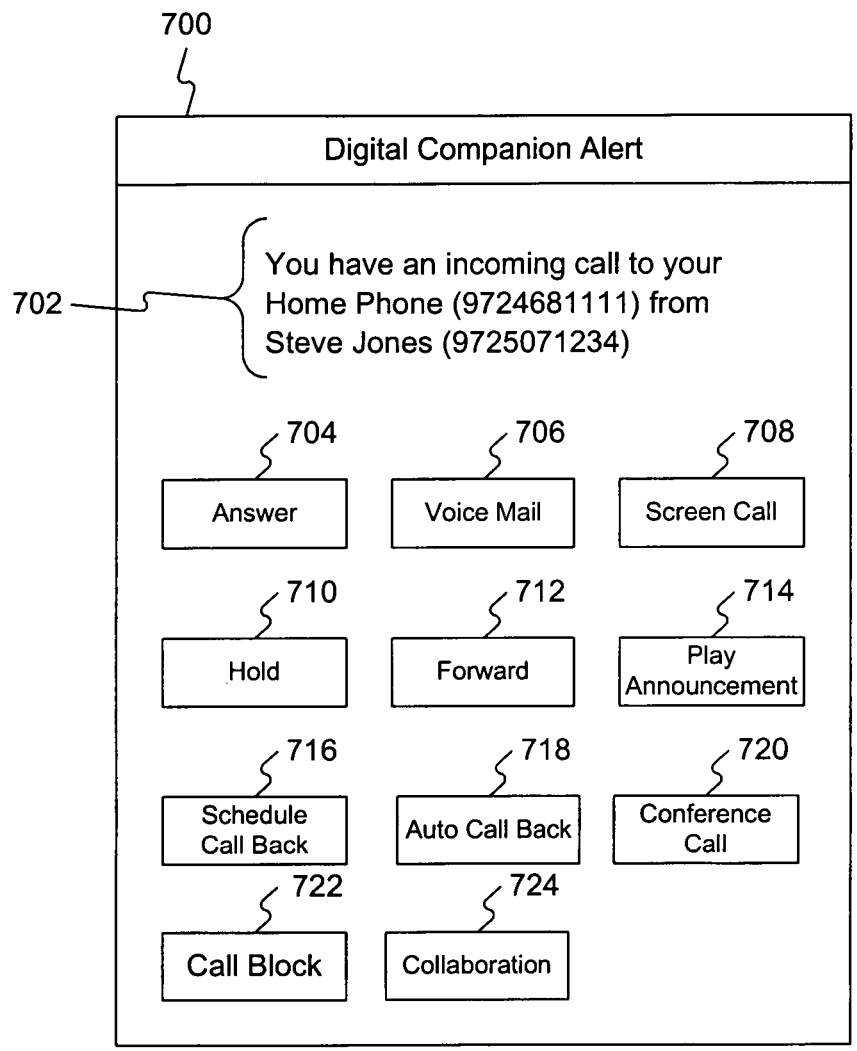
FIG. 7 is a diagram of an exemplary user interface including customer-selectable real-time call management options consistent with the present invention.

FIG. 7 is a diagram of an exemplary user interface 700 including customer-selectable real-time call management options. User interface 700 may be a display on a customer device, such as user terminal 112 or phone 114, that is currently showing an RTCM notification to a called party. The RTCM notification includes an area 702 indicating that the customer has an incoming call. Area 702 also provides an identification of the caller as well as the number being called. The number being called may belong to the device displaying the RTCM notification or another device. The RTCM notification has a plurality of associated user-selectable areas 704-724, allowing the customer to decide how an incoming call is to be routed. In one embodiment, the customer may select one of these user-selectable areas through any suitable input methods. For example, the customer may click on the desired option using a mouse, touch an appropriate area of a touchscreen, enter input on a keypad, etc., in order to choose the manner in which the incoming call is routed.

Selecting area 704 enables the customer to answer the call on the device that received the RTCM notification (e.g., the device the includes user interface 700). Selecting area 706 forwards the call to voice mail. Selecting area 708 initiates a call screening feature. Selecting area 710 places the call on hold. Selecting area 712 forwards the call to another device of the customer's choosing. Selecting area 714 plays an announcement for the calling party. Selecting area 716 enables a customer to schedule a call back event on a calendar. Selecting area 718 enables a customer to cause the calling party to be automatically called back after the current call. Selecting area 720 bridges the calling party onto the current call. Selecting area 722 causes a recording to be played indicating that the customer does not wish to speak to the calling party and optionally causes the calling party's telephone number to be added to a call block list. Selecting area 724 causes a collaboration request to be sent to the calling party consistent with the present invention.

Figure 8:
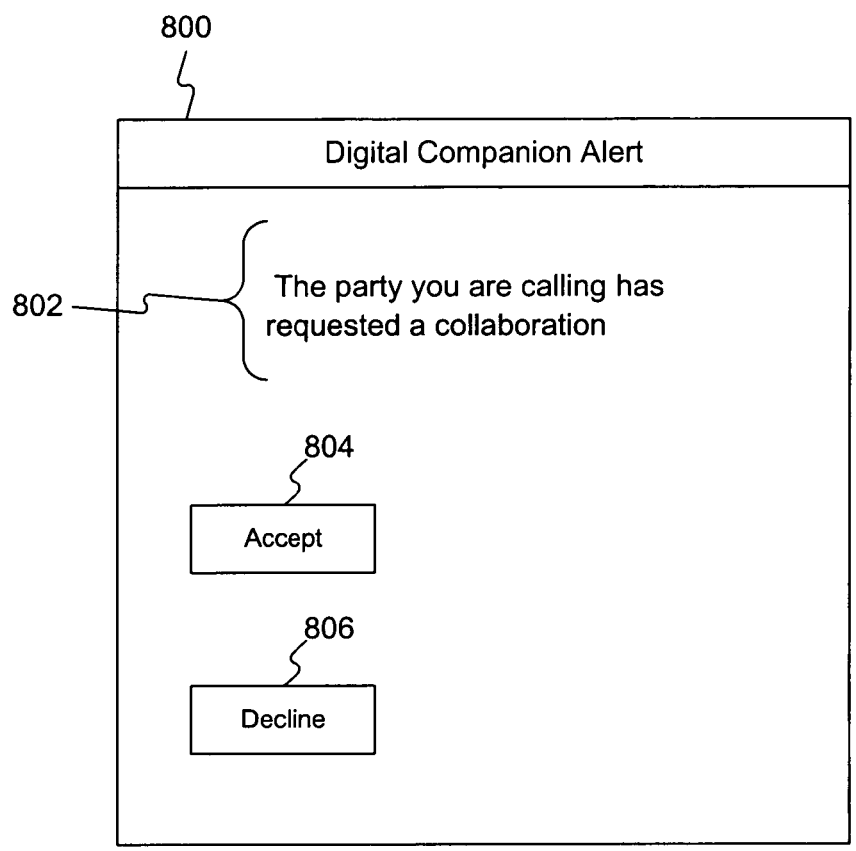
FIG. 8 is a diagram of an exemplary user interface indicating that a collaboration has been requested consistent with the present invention.

FIG. 8 is a diagram of an exemplary user interface 800 indicating a collaboration request to a calling party, consistent with the present invention. User interface 800 may be a display on a customer device, such as user terminal 112 or phone 114, that is currently showing a notification to a calling party. The notification includes an area 802 indicating that the calling party is receiving a request for a collaboration from the called party. The notification has two user-selectable areas 804 and 806 associated with it. Selecting area 804 enables the calling party to accept the collaboration request, thus initiating a collaboration between the calling party and the called party as discussed above with reference to FIGS. 6A and 6B. Selecting area 806 enables the calling party to decline the collaboration request as discussed above with reference to FIGS. 6A and 6B. In one embodiment, the calling party may select one of these user-selectable areas through any suitable input methods. For example, the calling party may click on the desired option using a mouse, touch an appropriate area of a touchscreen, enter input on a keypad, etc., in order to choose the manner in which the incoming call is routed.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method comprising:
   receiving information pertaining to a call to a called party placed by a calling party;
   sending a notification of the call to a device associated with the called party;
   receiving a response to the notification;
   sending a notification of a collaboration request to a device associated with the calling party based on the response, the collaboration request being a request for a collaboration to share data interactively between the called party and the calling party, the collaboration being in addition to the call;
   receiving a response to the collaboration request from the calling party, the response at least in part indicating whether the calling party accepts or denies the collaboration request; and
   connecting the call between the calling party and the called party when the calling party denies the collaboration request.

2. The method of claim 1, wherein the information pertaining to the call comprises at least one of called number data, calling name data, and calling number data.

3. The method of claim 1, wherein sending a notification of the call comprises:
   retrieving data corresponding to the called party using the information pertaining to the call;
   selecting a device associated with the called party to receive the notification of the call based on the data corresponding to the called party; and
   providing the notification of the call to the selected device for display on the selected device.

4. The method of claim 1, wherein the notification of the call comprises a user-selectable collaboration option.

5. The method of claim 4, wherein the notification of the call is displayed on the device associated with the called party.

6. The method of claim 1, wherein sending a notification of a collaboration request comprises:
   providing the notification of the collaboration request to a device used to place the call for display on the device used to place the call, based on a determination that the response to the notification of the call indicates that the collaboration is requested.

7. The method of claim 1, wherein sending a notification of a collaboration request comprises:
   retrieving data corresponding to the calling party using the information pertaining to the call, based on a determination that the response to the notification of the call indicates that the collaboration is requested;
   selecting a device associated with the calling party to receive the notification of the collaboration request based on the data corresponding to the calling party; and
   providing the notification of the collaboration request to the selected device associated with the calling party for display on the selected device associated with the calling party.

8. The method of claim 1, wherein the notification of the collaboration request comprises user-selectable options for accepting and declining the collaboration request.

9. The method of claim 1, further comprising, prior to sending the notification of the collaboration request:
   launching the collaboration between the called party and the calling party from the perspective of the called party.

10. The method of claim 9, the connecting comprising:
    launching the collaboration between the called party and the calling party from the perspective of the calling party, based on a determination that the calling party accepts the collaboration request; and
    connecting the call between the called party and calling party.

11. The method of claim 9, the connecting comprising:
    launching the collaboration between the called party and the calling party from the perspective of the calling party, based on a determination that the calling party accepts the collaboration request, wherein the collaboration includes a data connection and a voice connection.

12. The method of claim 9, the connecting comprising:
    launching the collaboration between the called party and the calling party from the perspective of the calling party based on a determination that the calling party accepts the collaboration request, wherein the collaboration includes a data connection and a videoconferencing connection.

13. The method of claim 9, the connecting comprising:
    ceasing the collaboration launched from the perspective of the called party based on a determination that the calling party declines the collaboration request; and
    connecting the call to the called party between the called party and the calling party.

14. A method comprising:
    receiving information pertaining to a call incoming to a called party, the call being placed by a calling party;

sending a notification of the call to a device associated with the called party;

receiving, while the call is available to be answered by the called party, a response to the notification from the called party indicating that the called party requests a collaboration to share data interactively with the calling party, the collaboration being in addition to the call;

sending a notification of a collaboration request to a device associated with the calling party based on the response;

receiving a response to the collaboration request from the calling party, the response at least in part indicating whether the calling party accepts or denies the collaboration request; and initiating the collaboration between the called party and the calling party based on a determination that the calling party accepts the collaboration request.

15. The method of claim 14, wherein sending a notification of the call comprises:
retrieving data corresponding to the called party using the information pertaining to the call;
selecting a device associated with the called party to receive the notification of the call based on the data corresponding to the called party; and
providing the notification of the call to the selected device for display on the selected device.

16. The method of claim 14, wherein the notification of the call comprises a user-selectable collaboration option.

17. The method of claim 16, wherein the notification of the call is displayed on the device associated with the called party.

18. The method of claim 14, wherein sending a notification of a collaboration request comprises:
providing the notification of the collaboration request to a device used to place the call for display on the device used to place the call, based on a determination that the response to the notification of the call indicates that the collaboration is requested.

19. The method of claim 14, wherein sending a notification of a collaboration request comprises:
retrieving data corresponding to the calling party using the information pertaining to the call, based on a determination that the response to the notification of the call indicates that the collaboration is requested;
selecting a device associated with the calling party to receive the notification of the collaboration request based on the data corresponding to the calling party; and
providing the notification of the collaboration request to the selected device associated with the calling party for display on the selected device associated with the calling party.

20. The method of claim 14, wherein the notification of the collaboration request comprises user-selectable options for accepting and declining the collaboration request.

21. The method of claim 14, wherein the collaboration includes a data connection and a voice connection.

22. The method of claim 14, wherein the collaboration includes a data connection and a videoconferencing connection.

23. The method of claim 14, comprising:
connecting the call to the called party between the called party and the calling party.

24. An apparatus comprising:
an application component, including a computer, for receiving information pertaining to a call to a called party placed by a calling party;
a notification component for sending a notification of the call to a device associated with the called party; and
a network component for receiving a response to the notification,
wherein the notification component sends a notification of a collaboration request to a device associated with the calling party based on the response, the collaboration request being a request for a collaboration to share data interactively between the called party and the calling party, the collaboration being in addition to the call;
the notification component receives a response to the collaboration request from the calling party, the response at least in part indicating whether the calling party accepts or denies the collaboration request; and
the application component connects the call between the calling party and the called party when the calling party denies the collaboration request.

25. The apparatus of claim 24, wherein the information pertaining to the call comprises at least one of called number data, calling name data, and calling number data.

26. The apparatus of claim 24, wherein sending a notification of the call comprises:
retrieving data corresponding to the called party using the information pertaining to the call;
selecting a device associated with the called party to receive the notification of the call based on the data corresponding to the called party; and
providing the notification of the call to the selected device for display on the selected device.

27. The apparatus of claim 24, wherein the notification of the call comprises a user-selectable collaboration option.

28. The apparatus of claim 27, wherein the notification of the call is displayed on the device associated with the called party.

29. The apparatus of claim 24, wherein the notification component:
provides the notification of the collaboration request to a device used to place the call for display on the device used to place the call, based on a determination that the response to the notification of the call indicates that the collaboration is requested.

30. The apparatus of claim 24, wherein the notification component:
retrieves data corresponding to the calling party using the information pertaining to the call, based on a determination that the response to the notification of the call indicates that the collaboration is requested;
selects a device associated with the calling party to receive the notification of the collaboration request based on the data corresponding to the calling party; and
provides the notification of the collaboration request to the selected device associated with the calling party or display on the selected device associated with the calling party.

31. The apparatus of claim 24, wherein the notification of the collaboration request comprises user-selectable options for accepting and declining the collaboration request.

32. The apparatus of claim 24, wherein the application component launches the collaboration between the called party and the calling party from the perspective of the called party.

33. The apparatus of claim 32, wherein the application component launches the collaboration by:
launching the collaboration between the called party and the calling party from the perspective of the calling party, based on a determination that the calling party accepts the collaboration request; and
connecting the call to the called party between the called party and calling party.

34. The apparatus of claim 32, wherein the application component launches the collaboration by:
launching the collaboration between the called party and the calling party from the perspective of the calling party, based on a determination that the calling party accepts the collaboration request, wherein the collaboration includes a data connection and a voice connection.

35. The apparatus of claim 32, wherein the application component launches the collaboration by:
launching the collaboration between the called party and the calling party from the perspective of the calling party, based on a determination that the calling party accepts the collaboration request, wherein the collaboration includes a data connection and a videoconferencing connection.

36. The apparatus of claim 32, wherein the application component ceases the collaboration launched from the perspective of the called party based on a determination that the calling party declines the collaboration request; and connects the call to the called party between the called party and the calling party.

37. An apparatus comprising:
an application component, including a computer, for receiving information pertaining to a call incoming to a called party, the call being placed by a calling party;
a notification component for sending a notification of the call to a device associated with the called party; and
a network component for receiving, while the call is available to be answered by the called party, a response to the notification from the called party indicating that the called party requests a collaboration to share data interactively with the calling party, the collaboration being in addition to the call,
wherein the notification component sends a notification of a collaboration request to a device associated with the calling party based on the response;
the notification component receives a response to the collaboration request from the calling party, the response at least in part indicating whether the calling party accepts or denies the collaboration request; and
the application component initiates the collaboration between the called party and the calling party based on a determination that the calling party accepts the collaboration request.

38. The apparatus of claim 37, wherein sending a notification of the call comprises:
retrieving data corresponding to the called party using the information pertaining to the call;
selecting a device associated with the called party to receive the notification of the call based on the data corresponding to the called party; and
providing the notification of the call to the selected device for display on the selected device.

39. The apparatus of claim 37, wherein the notification of the call comprises a user-selectable collaboration option.

40. The apparatus of claim 39, wherein the notification of the call is displayed on the device associated with the called party.

41. The apparatus of claim 37, wherein the notification component provides the notification of the collaboration request to a device used to place the call for display on the device used to place the call, based on a determination that the response to the notification of the call indicates that the collaboration is requested.

42. The apparatus of claim 37, wherein the notification component:
retrieves data corresponding to the calling party using the information pertaining to the call, based on a determination that the response to the notification of the call indicates that the collaboration is requested;
selects a device associated with the calling party to receive the notification of the collaboration request based on the data corresponding to the calling party; and
provides the notification of the collaboration request to the selected device associated with the calling party for display on the selected device associated with the calling party.

43. The apparatus of claim 37, wherein the notification of the collaboration request comprises user-selectable options for accepting and declining the collaboration request.

44. The apparatus of claim 37, wherein the collaboration includes a data connection and a voice connection.

45. The apparatus of claim 37, wherein the collaboration includes a data connection and a videoconferencing connection.

46. The apparatus of claim 37, wherein the application component connects
the call to the called party between the called party and the calling party.

47. An apparatus comprising:
a memory having a program that:
receives information pertaining to a call to a called party placed by a calling party;
sends a notification of the call to a device associated with the called party;
receives a response to the notification;
sends a notification of a collaboration request to a device associated with the calling party based on the response, the collaboration request being a request for a collaboration to share data interactively between the called party and the calling party, the collaboration being in addition to the call;
receives a response to the collaboration request from the calling party, the response at least in part indicating whether the calling party accepts or denies the collaboration request; and
connects the call between the calling party and the called party when the calling party denies the collaboration request; and
a processor that runs the program.

48. An apparatus comprising:
a memory having a program that:
receives information pertaining to a call incoming to a called party, the call being placed by a calling party;
sends a notification of the call to a device associated with the called party;
receives, while the call is available to be answered by the called party, a response to the notification from the called party indicating that the called party requests a collaboration to share data interactively with the calling party, the collaboration being in addition to the call;
sends a notification of a collaboration request to a device associated with the calling party based on the response;
receives a response to the collaboration request from the calling party, the response at least in part indicating whether the calling party accepts or denies the collaboration request; and initiates the collaboration between the called party and the calling party based on a determination that the calling party accepts the collaboration request; and a processor that runs the program.

49. A non-transitory computer-readable medium containing instructions for performing a method, the method comprising:

receiving information pertaining to a call to a called party placed by a calling party;

sending a notification of the call to a device associated with the called party;

receiving a response to the notification;

sending a notification of a collaboration request to a device associated with the calling party based on the response, the collaboration request being a request for a collaboration to share data interactively between the called party and the calling party, the collaboration being in addition to the call;

receiving a response to the collaboration request from the calling party, the response at least in part indicating whether the calling party accepts or denies the collaboration request; and connecting the call between the calling party and the called party when the calling party denies the collaboration request.

50. The non-transitory computer-readable medium of claim 49, wherein the information pertaining to the call comprises at least one of called number data, calling name data, and calling number data.

51. The non-transitory computer-readable medium of claim 49, wherein sending a notification of the call comprises:

retrieving data corresponding to the called party using the information pertaining to the call;

selecting a device associated with the called party to receive the notification of the call based on the data corresponding to the called party; and providing the notification of the call to the selected device for display on the selected device.

52. The non-transitory computer-readable medium of claim 49, wherein the notification of the call comprises a user-selectable collaboration option.

53. The non-transitory computer-readable medium of claim 52, wherein the notification of the call is displayed on the device associated with the called party.

54. The non-transitory computer-readable medium of claim 49, wherein sending a notification of a collaboration request comprises:

providing the notification of the collaboration request to a device used to place the call for display on the device used to place the call, based on a determination that the response to the notification of the call indicates that the collaboration is requested.

55. The non-transitory computer-readable medium of claim 49, wherein sending a notification of a collaboration request comprises:

retrieving data corresponding to the calling party using the information pertaining to the call, based on a determination that the response to the notification of the call indicates that the collaboration is requested;

selecting a device associated with the calling party to receive the notification of the collaboration request based on the data corresponding to the calling party; and providing the notification of the collaboration request to the selected device associated with the calling party for display on the selected device associated with the calling party.

56. The non-transitory computer-readable medium of claim 49, wherein the notification of the collaboration request comprises user-selectable options for accepting and declining the collaboration request.

57. The non-transitory computer-readable medium of claim 49, further comprising, prior to sending the notification of the collaboration request:

launching the collaboration between the called party and the calling party from the perspective of the called party.

58. The non-transitory computer-readable medium of claim 57, the connecting comprising:

launching the collaboration between the called party and the calling party from the perspective of the calling party, based on a determination that the calling party accepts the collaboration request; and connecting the call to the called party between the called party and calling party.

59. The non-transitory computer-readable medium of claim 57, the connecting comprising:

launching the collaboration between the called party and the calling party from the perspective of the calling party, based on a determination that the calling party accepts the collaboration request, wherein the collaboration includes a data connection and a voice connection.

60. The non-transitory computer-readable medium of claim 57, the connecting comprising:

launching the collaboration between the called party and the calling party from the perspective of the calling party, based on a determination that the calling party accepts the collaboration request, wherein the collaboration includes a data connection and a videoconferencing connection.

61. The non-transitory computer-readable medium of claim 57, the connecting comprising:

ceasing the collaboration launched from the perspective of the called party based on a determination that the calling party declines the collaboration request; and connecting the call to the called party between the called party and the calling party.

62. A non-transitory computer-readable medium containing instructions for performing a method, the method comprising:

receiving information pertaining to a call incoming to a called party, the call being placed by a calling party;

sending a notification of the call to a device associated with the called party;

receiving, while the call is available to be answered by the called party, a response to the notification from the called party indicating that the called party requests a collaboration to share data interactively with the calling party, the collaboration being in addition to the call;

sending a notification of a collaboration request to a device associated with the calling party based on the response;

receiving a response to the collaboration request from the calling party, the response at least in part indicating whether the calling party accepts or denies the collaboration request; and initiating the collaboration between the called party and the calling party based on a determination that the calling party accepts the collaboration request.

63. A method comprising:

receiving, at a device associated with a called party, notification of a call incoming to the called party, the call being placed by a calling party;

receiving input from the called party indicative of a response to the notification; and sending, to a service center, response information reflective of the response to the notification while the call is available to be answered by the called party, wherein, based on the response, the service center:
   sends a notification of a collaboration request to a device associated with the calling party based on the response information, the collaboration request being a request for a collaboration to share data interactively between the called party and the calling party in addition to the call;
   receives a response to the collaboration request from the calling party, the response at least in part indicating whether the calling party accepts or denies the collaboration request; and
   initiates the collaboration between the called party and the calling party based on a determination that the calling party accepts the collaboration request.

64. A method comprising:
receiving, from a service center, notification of a collaboration request at a device associated with the calling party, wherein prior to the receiving the service center:
   receives notification of a call incoming to a called party, the call being placed by the calling party;
   sends a notification of the call to a device associated with the called party;
   receives, while the call is available to be answered by the called party, a response to the notification of the call from the called party indicating that the called party requests a collaboration to share data interactively with the calling party, the collaboration being in addition to the call; and
   sends the notification of the collaboration request based on the response to the notification of the call;
receiving from the calling party a response to the notification of the collaboration request, the response at least in part indicating whether the calling party accepts or denies the collaboration request; and
sending, to the service center, response information reflective of the response to the notification of the collaboration request, wherein the service center initiates the collaboration between the called party and the calling party based on a determination that the calling party accepts the collaboration request.

65. A device comprising:
a memory having a program that:
   receives notification of a call incoming to a called party, the call being placed by a calling party;
   receives input from the called party indicative of a response to the notification; and
   sends, to a service center, response information reflective of the response to the notification while the call is available to be answered by the called party, wherein, based on the response, the service center:
     sends a notification of a collaboration request to a device associated with the calling party based on the response information, the collaboration request being a request for a collaboration to share data interactively between the called party and the calling party in addition to the call;
     receives a response to the collaboration request from the calling party, the response at least in part indicating whether the calling party accepts or denies the collaboration request; and
     initiates the collaboration between the called party and the based on a determination that the calling party accepts the collaboration request;
a user interface that displays the notification of the call; and
a processor that runs the program.

66. A device comprising:
a memory having a program that:
   receives, from a service center, notification of a collaboration request at a device associated with a calling party, wherein prior to the receiving the service center:
     receives notification of a call incoming to a called party, the call being placed by the calling party;
     sends a notification of the call to a device associated with the called party;
     receives, while the call is available to be answered by the called party, a response to the notification of the call from the called party indicating that the called party requests a collaboration to share data interactively with the calling party, the collaboration being in addition to the call; and
     sends the notification of the collaboration request based on the response to the notification of the call;
   receives from the calling party a response to the notification of the collaboration request, the response at least in part indicating whether the calling party accepts or denies the collaboration request; and
   sends, to the service center, response information reflective of the response to the notification of the collaboration request, wherein the service center initiates the collaboration between the called party and the calling party based on a determination that the calling party accepts the collaboration request;
a user interface that displays the notification of the collaboration request; and
a processor that runs the program.

67. A system comprising:
a voice network;
a data network;
a device associated with a called party;
a device associated with a calling party; and
a service center operable to:
   receive information pertaining to a call incoming to the called party, the call being placed by the calling party;
   send a notification of the call to the device associated with the called party;
   receive while the call is available to be answered by the called party, a response to the notification from the called party indicating that the called party requests a collaboration to share data interactively with the calling party, the collaboration being in addition to the call, send a notification of a collaboration request to the device associated with the calling party based on the response;
   receive a response to the collaboration request from the calling party, the response at least in part indicating whether the calling party accepts or denies the collaboration request; and
   initiate the collaboration between the called party and the calling party based on a determination that the calling party accepts the collaboration request.

68. An apparatus comprising:
an application server operable to receive information pertaining to a call incoming to a called party, the call being placed by a calling party;
a notification server operable to send a notification of the call to a device associated with the called party; and
a network access server operable to receive, while the call is available to be answered by the called party, a response to the notification from the called party indicating that the called party requests a collaboration to share data interactively with the calling party, the collaboration being in addition to the call, wherein
the notification server sends a notification of a collaboration request to a device associated with the calling party based on the response;
the notification server receives a response to the collaboration request from the calling party, the response at least in part indicating whether the calling party accepts or denies the collaboration request; and
the application server initiates the collaboration between the called party and the calling party based on a determination that the calling party accepts the collaboration request.

69. A method comprising:
receiving information pertaining to a call to a called party placed by a calling party;
sending a notification of the call to a device associated with the called party;
receiving a response to the notification of the call;
sending a notification of a collaboration request to a device associated with the calling party based on the response, the collaboration request being a request for a collaboration to share data interactively between the called party and the calling party, the collaboration being in addition to the call;
receiving a response to the collaboration request from the calling party, the response at least in part indicating whether the calling party accepts or denies the collaboration request;
connecting the call between the calling party and the called party when the calling party denies the collaboration request; and
conducting the collaboration between the called party and the calling party when the calling party accepts the collaboration request,
wherein conducting the collaboration comprises using application software that provides multiparty communication between at least the called party and the calling party.

70. The method according to claim 69, further comprising:
launching the collaboration between the called party and the calling party from the perspective of the called party, prior to sending the notification of the collaboration request.

71. The method according to any one of claims 1, 14, 63, 64 and 69 further comprising:
inquiring whether the called party is logged into a device capable of a collaborative connection and, if negative, processing said call without sending the notification of collaboration.

72. The apparatus according to any one of claims 24 and 37 wherein:
the application component inquires whether the called party is logged into a device capable of a collaborative connection and, if negative, the call is processed without the notification component sending the notification of a collaboration request to a device associated with the calling party.

73. The apparatus according to claim 68 wherein:
the application server inquires whether the called party is logged into a device capable of a collaborative connection and, if negative, the call is processed without the notification server sending the notification of a collaboration request to a device associated with the calling party.

74. The apparatus according to any one of claims 47 and 48 including the memory having the program that further comprises:
inquiring whether the called party is logged into a device capable of a collaborative connection and, if negative, processing said call without sending the notification of collaboration request.

75. The computer-readable medium according to any one of claims 49 and 62 wherein the method further comprises:
inquiring whether the called party is logged into a device capable of a collaborative connection and, if negative, processing said call without sending the notification of collaboration request.

76. The device according to any one of claims 65 and 66 wherein the program further comprises:
inquiring whether the called party is logged into a device capable of a collaborative connection and, if negative, processing said call without sending the notification of collaboration request.

77. The system of claim 67 wherein the service center is further operable to:
inquire whether the called party is logged into a device capable of a collaborative connection and, if negative, process said call without sending the notification of collaboration request.

* * * * *